US007197641B2

(12) United States Patent
Stangl

(10) Patent No.: US 7,197,641 B2
(45) Date of Patent: Mar. 27, 2007

(54) METHOD AND DEVICE FOR THE TRANSFER OF ELECTRONIC DATA VOLUMES

(75) Inventor: Norbert Stangl, Köln (DE)

(73) Assignee: Webpay International AG, Zug (CH)

( * ) Notice: Subject to any disclaimer, the term of this patent is extended or adjusted under 35 U.S.C. 154(b) by 868 days.

(21) Appl. No.: 10/149,155

(22) PCT Filed: Dec. 8, 2000

(86) PCT No.: PCT/DE00/04404

§ 371 (c)(1),
(2), (4) Date: Oct. 21, 2002

(87) PCT Pub. No.: WO01/42946

PCT Pub. Date: Jun. 14, 2001

(65) Prior Publication Data

US 2003/0145234 A1    Jul. 31, 2003

(30) Foreign Application Priority Data

Dec. 10, 1999  (DE) ................ 199 59 639
Nov. 27, 2000  (DE) ................ 100 58 835

(51) Int. Cl.
*H04L 9/00*      (2006.01)
*G06F 15/16*    (2006.01)
(52) U.S. Cl. .................. 713/168; 726/28; 709/223
(58) Field of Classification Search ............... 726/26, 726/28; 713/155, 168
See application file for complete search history.

(56) References Cited

U.S. PATENT DOCUMENTS

| 5,678,041 A | 10/1997 | Baker et al. |
| 5,708,780 A | 1/1998 | Levergood et al. |
| 5,812,776 A | 9/1998 | Gifford |
| 5,835,718 A | 11/1998 | Blewett |
| 5,920,859 A * | 7/1999 | Li .................. 707/5 |
| 6,061,448 A | 5/2000 | Smith et al. |
| 6,192,407 B1 | 2/2001 | Smith et al. |

(Continued)

FOREIGN PATENT DOCUMENTS

EP    0748095 A2    5/1996

(Continued)

OTHER PUBLICATIONS

Iyengar, Arun, "Dynamic Argument Embedding: Preserving State on the World Wide Web", IEEE Internet Computing, Mar./Apr. 1997, 1089-7801, pp. 50-56.

*Primary Examiner*—Kambiz Zand
*Assistant Examiner*—Ellen C. Tran
(74) *Attorney, Agent, or Firm*—Fenwick & West LLP

(57) ABSTRACT

Apparatus and method of transmitting an electronic data set between a provider server and a user computer retrieves the electronic data set from the provider server with the aid of a server means and is analyzed and processed electronically in the server means. The processed electronic data set is transmitted by the server means to the user computer. The electronic data set is requested by means of the user computer form the provider server, but transmission to the user computer always is effected with involvement of the server means. In this manner retrieval of the electronic data set with cost can be controlled and logged for accounting purposes with the assistance of the server means.

15 Claims, 2 Drawing Sheets

U.S. PATENT DOCUMENTS 6,615,258 B1 * 9/2003 Barry et al. ................ 709/223

FOREIGN PATENT DOCUMENTS

| | | | |
|---|---|---|---|
| EP | 0869652 A2 | 10/1998 | |
| EP | 0940960 A1 | 9/1999 | |
| WO | WO 96/42041 | 12/1996 | |
| WO | 0801487 A2 | 10/1997 | |

* cited by examiner

METHOD AND DEVICE FOR THE TRANSFER OF ELECTRONIC DATA VOLUMES

FIELD OF THE INVENTION

The invention concerns the field of electronic data set transmission between a provider server and a user computer network, in particular the internet.

BACKGROUND OF THE INVENTION

A great variety of information is retrievable from the internet by any user. The retrievable information made available by different providers is filed in the form of electronic data sets which are stored in so-called servers of the providers or other offerers of services. The user may retrieve information stored, via a user computer, making use of the services offered by a provider to obtain access to the internet. The user computer is furnished with a browser to permit handling of the information retrieved.

Most of the information stored in provider servers of the internet can be fetched by the user without pay. However, the internet also offers information for which the user must pay, i.e. the user must pay a fee for retrieving such information. A substantial problem to be solved in this context is the precise accounting of the compulsory fee in correspondence with the amount of information.

In the case of a known method for retrieval of information from the internet with cost the user, wishing to access such information with cost, is warned on an announcement page which is displayed by means of the browser in the user computer that a fee becomes due for retrieval of the desired information. For subsequent access to the information with cost, the user first must interrupt the existing data transmission circuit between the user computer and the service means of the provider. This means that the data connection with the user's provider is disconnected. Subsequent dialing of a new telephone number will close a new data transmission circuit between the user computer and another provider. The user was advised of this telephone number on the announcement page which informed him about the obligation to pay a fee. Thereafter, the user may retrieve the information with cost from the internet via the newly dialed data line.

It is a disadvantage of the known method that the dialing, both to clear and to set up a data line, entails time consuming dialing procedures. If the user wishes to switch back and forth between retrieval of information free of charge and information with cost this means that multiple dialing procedures are required.

SUMMARY OF THE INVENTION

It is the object of the invention to provide an improved method and an improved apparatus for transmission of electronic data sets between a provider server and a user computer, overcoming the disadvantages of the state of the art.

The invention embraces the essential concept of accomplishing transmission of the electronic data met between the provider server and the user computer through the intermission of a server means which, preferably, is based on the so-called proxy technology. In this manner the provision of the server means makes it possible to supervise the data stream from the provider server to the user computer in terms of amount and time needed for the data to flow. Thus the transmission of information with cost from the provider server to the user computer can be monitored and an accurate account can be furnished.

The user of the user computer begins by requesting retrieval of the electronic data set from the provider server. The provider server automatically recognizes that the user request is a request for information with cost and, therefore, passes the user request on to the server means. The further stops for transmitting the electronic data set to the user computer then are initiated and controlled by the server means. As a consequence, the subsequent electronic data exchange will take place between the server means and the user computer, to the extent that the user computer is involved. The server means retrieves the electronic data sets with cost, As desired by the user, from the provider server and transmits them to the user computer upon processing.

The solution according to the invention does not require multiple dialing to clear a data line and set up a data line when the user changes between retrieval of data sets which are free of charge and those for which he must pay. The solution consequently is more user friendly.

It is an essential advantage of the invention that no additional software must be installed either by the user on the user computer or by the provider on the provider server so that the implementing expenditure and costs which result from the incorporation of the user computer as well as the provider server in an apparatus or system for carrying out the novel method are low.

Moreover, the method and apparatus of transmitting electronic data sets which are retrievable via the internet present a solution which operates according to the so-called proxy principle and is based entirely on the internet.

When making use of the solution according to the invention, furthermore, the provider need not create and maintain dual internet presentations, as is required with the known solution described above for retrieval with cost of electronic data sets. For an internet presentation, in the came of the known solution, the provider must maintain a data set on his own server and a data set on the server to be dialed anew by the user after disconnecting of his existing data line. The novel method and the novel apparatus, therefore, permit saving of storage capacities. What is more, there will be no maintenance expenditure for time limited updating.

To prevent the user from getting to know the data set address which belongs to the electronic data set desired by the user, a convenient further development of the invention provides for automatic generation, in the server means, of a temporary communication address for the directory and assigning it to the electronic data set before the electronic data set is transmitted from the server means to the user computer. In this manner the electronic data set is passed on to the user computer with an electronically rewritten data set address which includes the temporary communication address. If the user does not know the data set address he cannot set access to the electronic data met by circumventing the obligation to pay for the retrieval.

A convenient modification of the invention provides that the temporary communication address comprises a temporary parameter electronically associated with the current release. In this manner the recording and accounting possibilities to cover the electronic data sets which were retrieved with coat are improved by simple means.

A preferred modification of the invention offers a possibility of limiting the time of retrieval with cost of the electronic data set in that the electronic memorizing of the current release is restricted to a predetermined period of time.

The following method steps are provided in an advantageous further development in order to make sure that the user agrees to the obligation to pay when retrieving electronic data sets with cost:

automatically requesting a user input for electronically recording a readiness to pay by way of the server means and the user computer if it is determined in the electronic processing of the user data recorded and the information about the electronically recorded user request according to method step (d) that no information about the current release for the electronic directory is electronically stored in the server means for the user authenticated by means of the user data recorded; and electronically recording and processing the requested user input such that an electronic account balance assigned to the user is_adjusted automatically and the information about the current release for the electronic directory is stored in the server means.

A convenient modification of the invention may provide for shortening of the time before the user's actual access to electronic data sets with cost, particularly in the event of multiple access to the same data set, by electronically generating a temporary identification file by way of the server means upon authentication or the user according to method step (b) and storing this file, after transmission to the user computer, in a memory means of the user computer, and by electronically analyzing the temporary identification file for renewed user authentication which does not require requesting nor recording or the user data, after a renewed user request for retrieval of the electronic data set or another electronic data net from the electronic directory in the provider server was generated by the user by means of the browser in the user computer.

An advantageous further development of the invention for improving user friendliness, especially transparency of the method from the user's point of view provides that, after renewed authentication and subsequent renewed authorization by the server means carried out according to method step (d), a remaining period of time of the current release is determined automatically and information about the remaining period of time is generated electronically and transmitted to the user computer for output. In this manner the user is advised of the time left during which the electronic data set with cost will be available before renewed retrieval of an electronic data set with cost.

Unnecessary demand for storage can be avoided according to a preferred modification of the invention according to which the temporary identification file is erased automatically from the memory means upon closing of the browser in the user computer. This, above all, takes the burden off the main memory and, besides, cancellation of the temporary identification file is effected so as to guarantee additional security features.

The method may comprise the steps recited below in order to permit accurate and faultless accounting of electronic data sets with cost also in the event that the electronic data sets are nested and interconnected with the aid of hyperlinks:

syntactically analyzing the electronic data set by way of the server means for electronically recording hyperlink elements which are included in the electronic data set and each comprise a different data set address pointing to an associated data set in the network, especially in the provider server;

electronically rewriting the data set address of one of said hyperlink elements prior to transmission of a part of the electronic data set which includes the one hyperlink element from the server means to the user computer according to method stop (d) if it is determined in the electronic checking of the one hyperlink element that the data set address of the one hyperlink element lies within the electronic directory, the electronic rewriting being carried out such that a rewritten data set address of the one hyperlink element is generated which address points to the server means; and storing an electronic allocation between the data set address of the one hyperlink element and the rewritten data set address of the one hyperlink element by way of the server means so that, upon a user request for retrieval of the data set belonging to the data set address of the one hyperlink element, transmission of the associated data set with involvement of the server means is guaranteed.

An advantageous further development of the invention provides for minimizing waiting times when retrieving electronic data sets by carrying out the syntactic analyzing on the fly while the electronic data set is transmitted at least in part from the provider server to the server means.

BRIEF DESCRIPTION OF THE DRAWINGS

The invention will be described in greater detail below, by way of example, with reference to a drawing in which.

DETAILED DESCRIPTION OF THE INVENTION

Figure 1:
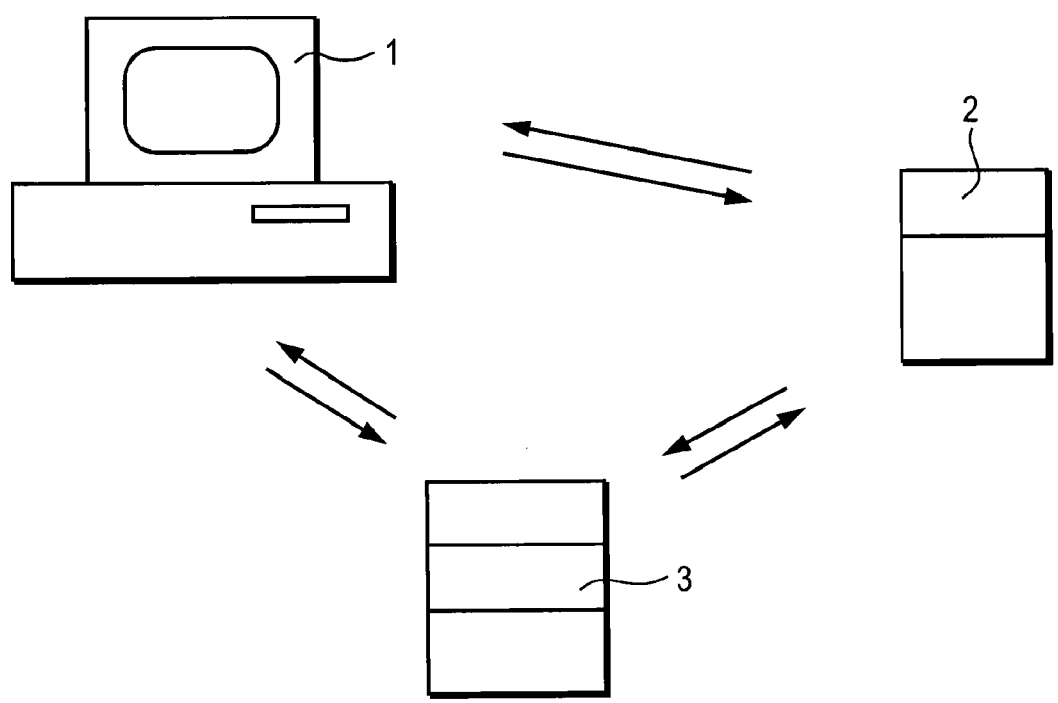
FIG. 1 is a diagrammatic presentation of a network including a user computer, a provider server, and a server means.

As shown in FIG. 1, electronic data can be exchanged between a user computer 1, a provider server 2, and a server means 3, respectively. This is illustrated symbolically by arrows in FIG. 1. The provider server 2 as well as the server means 3 each are embodied by parts of a computer network, in particular parts of the internet.

Electronic data sets by providers are stored in the provider server 2, and these electronic data sets are kept ready for being called up by users, for instance, so as to be retrieved by means of the user computer 1. The electronic data sets are stored in the provider server 2 in electronic directories to each of which a communication address is assigned. In the internet environment, the communication address is a so-called link. The electronic data sets are stored in the directories; each of the electronic data sets is stored under a designation or file name. Together with the designation, the communication address forms a data set address which belongs to the data set. The electronic data sets may be data sets having any desired data format, for example, html data, MP3 files, JPEG files, script data, etc. The electronic data sets may comprise image, text, and/or sound information suitable to be read out by means of the user computer or some other peripheral equipment.

The provider may choose to offer the electronic data sets stored in the provider server 2 for retrieval either free of charge or with cost. If his intention is to make an electronic data set available against payment the provider first must register with the operator of the server means 3. That may be done by telephone, via the internet, or in written form. Doing that, the provider will have to reveal personal data and/or company specific information, such as his name, the company name, bank account, etc.

In a subsequent step, the provider may stipulate for which of the data sets offered by him payment shall be required. For this purpose, a user surface displayed to the provider on a provider computer (not shown) connected to the server means 3 offers the provider tables in which the user, first of all, marks the various electronic directories/regions for which prices are to be indicated or payment made by entering the corresponding communication address (link—URL address). Following that, the server means 3 generates new communication addresses for the communication addresses indicated by the provider and advises the provider thereof via the server means 3, preferably by the provider computer. Instead of the communication addresses, the provider then must enter the new communication addresses of which he has been advised into the directories with the data sets to be paid for named by the provider which are stored in the provider server 2.

When the provider has taken the second registration step, those directories in the provider server 2 in which data sets with cost are stored will have received a communication address (a link) with the consequence that the user's attempt to retrieve data sets from these directories by means of the user computer 1 will cause the user request to be passed on to the server means 3. The new communication addresses generated by the server terns 3, communicated to the provider, and inserted by the provider, for example, may have the following format: "http://www.premium-link.net/$LN$O$/dataset.html" or "http://LN.O.premium-link.net" or "http://LN.O.premium-link.net/dataset.html". This new data set address composed of the new communication address "http://www.premium-link/$LN$O$" and the designation of the data set "dataset.html" was generated for the provider's original data set address "http://www.provider.com/current/dataset.html" after the provider had indicated that data sets, such as the "dataset.html" stored in the directory belonging to the communication address "http;//www.provider.com/current" were to be retrievable with cost.

The insertion "premium-link.net", chosen in exemplary fashion, causes the user request to be passed on from the provider server 2 to the server means 3 which in this case is electronically identifiable based on the designation "premium-link.net". It is essential in this context that the new communication address inserted makes sure that the user request is passed on from the provider server 2 to the server means 3. The insertion "LN" stands for "Link Number" and is a figure assigned to the respective communication address or the respective link of the provider. These figures preferably are assigned in consecutive order. The "0" insertion serves characterizing purposes and indicates that this is a new user request. Based on this inserted "0", the server means 3 recognizes that the user request which was passed on is a request which has not yet been dealt with. These insertions are followed by "dataset.html", i.e. that part of the original data set address which was taken over unchanged from the data set "dataset.html".

A crawler module automatically checks the functionality of the new communication addresses (links).

The provider must fill in a description field in the menu read out by means of the user computer and must make a classification for each directory mentioned for which payment is to be due. Theme provider data may be analyzed automatically for statistical purpose, for instance.

Once the provider has fixed a directory as being offered against payment, the provider may determine that a subordinate directory under this directory should be available with cost. To this end, the provider enters the subordinate directory in the user surface provided. Thereupon the server means 3 will generate another new communication address also for the subordinate directory in the manner described above, and the provider must incorporate it in the information stored in the provider server 2, instead of the original communication address of the subordinate directory.

It is likewise possible to provide for the information which is to be given a price or made retrievable against payment to comprise a single data set only, such as the file "example.html" to which the data set address "http://www-.provider.com/example.html" is allocated. During the provider installation the server means 3 in this case will generate the new data set address "http://www.premium-link.net/$LN$O$/example.html" or "http://LN.O.premium-link.net/example.html". The data set "example.html" also may be devised as part of a directory for which an obligation to pay already was fixed in the manner described above.

When determining the directories for which prices or the obligation to pay are to be indicated, the provider must choose between different tariff models. When the user retrieves the provider's data sets, observance of those tariff models is verified automatically by way of the server means 3. The setup of the provider data sets to be retrieved with cost is terminated with the input of the tariff model which the provider desires.

The setup procedure for determining the information which is to be available with cost can be facilitated by resorting to a so-called web crawler so that the provider need not enter the communication addresses of the directories to be fixed as having to be paid for. Instead, they will be read in automatically by the web crawler.

Figure 2:
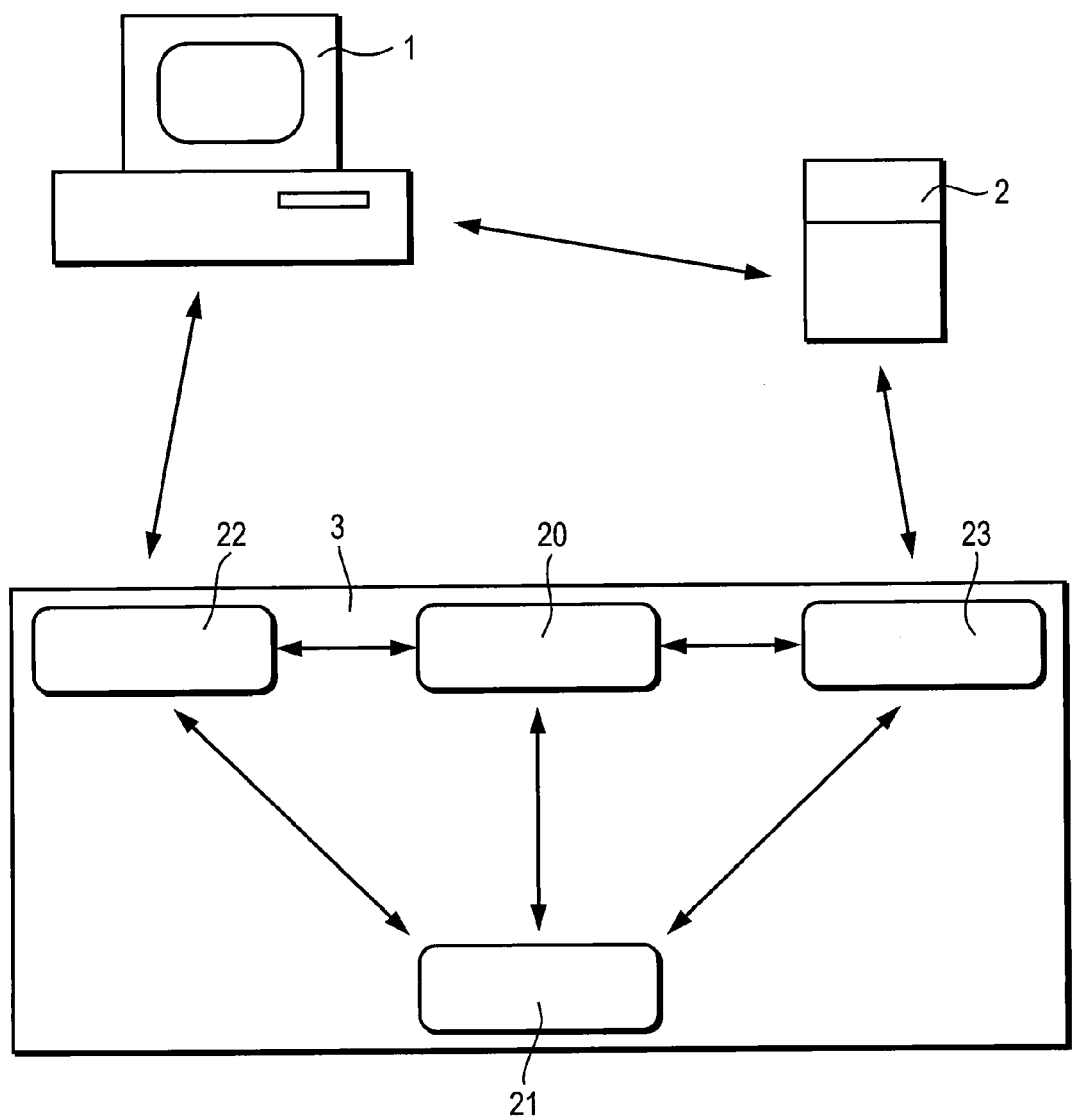
FIG. 2 is a diagrammatic presentation of means of the server means illustrated in FIG. 1.

For further description, reference will be made below to FIG. 2 as well. It shows not only the user computer 1 and the provider server 2 but also includes a diagrammatic presentation of individual means of the server means 3. Let it be assumed that the user computer 1 issues a user request for retrieval of a data set from the provider server 2. This user request is automatically passed on from the provider server 2 to the server means 3 due to the new communication addresses/data set addresses inserted by the provider. The information about the user request received from the server means 3 for retrieval of the data set, first, is supplied to a session management 20. By means of this session management 20 an intermediate page of information is generated and transmitted to the user computer 1 to be displayed on the screen of the user computer. The intermediate page informs the user about the fundamental obligation to pay in connection with the data set he demanded. The intermediate page may contain additional information about the kind and scope of the obligation of payment.

The insertion "0" in the communication address/data set address advises the session management 20 that this is a new user request not yet handled by the server means 3. Following this, a session manager 21 is informed accordingly. The session manager 21 initiates a process for automatic authentication of the user who triggered this user request by means of the use computer 1 and the browser installed in the same. To this and the session manager 21 generates requests which are transmitted to the user computer 1 asking him to make certain user entries. This includes a question as to whether or not the user already has been registered in the server means 3 as a user of the method of requesting electronic data sets with cost from the provider server 2. Other question are for entry of a user identification and a password. The exchange of data between the server means 3 and the user computer 1 required for authentication takes place, at least in part, with involvement off a user data bass 22 (cf. FIG. 2). Data stored in the user data base 22 are drawn upon for automatically verifying the user date entered by the user and recorded electronically for authentication.

When the user has been authenticated successfully the next step is taken to check whether the authenticated user is authorized to retrieve the electronic data set requested by the user. What this means is that, after a call from the session management 20, the session manager 21 automatically checks whether a current release exists for the authenticated user for the directory characterized by means of the insertion "LN" in the communication address or for the data set characterized by means of the insertion "LN" t in the data set address. To accomplish that, the session manager 21 accesses stored release data. The release data comprise information about releases or sessions present at certain times. A or session is a valid electronic allocation between a communication address/data set address and an authenticated user. Releases each exist for a predetermined period of time after the user has declared his consent upon being presented with a question generated by means of the session manager 21 and transmitted to the user computer 1. As a result of the user's consent, an account balance electronically assigned to the user and preferably stored in the user data base 22 is increased by a fee to be paid for the release, and a release is generated and stored electronically for the directory desired by the user.

With the embodiment thus far described authentication of the user was done by means of automatically asking for, electronically recording, and automatically verifying a user input. Yet it is also possible to authenticate a user on the basis of an electronic certificate. The electronic certificate may be stored as an identification file in the memory or the user computer 1, especially the main memory thereof (so-called temporary cookie) or it may be designed as a browser certificate in the browser installed in the user computer 1. The identification file is stored in the user computer 1 once the user has started the browser in the user computer 1, i.e. a computer program forming the browser has been started, and the user has authenticated himself in connection with the retrieval of data sets with cost. The identification file stays memorized in the user computer 1 until the browser is closed. Closing of the browser automatically erases the identification file from the user computer 1. During the user authentication process the server means 3 automatically searches for the identification file and evaluates it in respect of the authorization data it comprises, for the time the identification file is memorized in the user computer 1.

In contrast to the identification file, the browser certificate is integrated in the browser means in such a way that the browser certificate will continue to be available for authorization of the user even after closing of the browser and repeated opening thereof. The permanent integration of the browser certificate takes place after the user has registered for the first time for retrieval with cost of data sets from the provider server 2.

After the user authentication has been determined electronically by means of the user input, the identification file, or the browser certificate, the electronic data set desired by the user can be transmitted from the provider server 2 via the server means 3 to the user computer 1. Yet this does not take place until after the subsequent authorization of the user.

When the data set requested by the user is retrieved from the provider server 2 through the server means 3 the data set can-not be passed on unchanged from the server means 3 to the user computer 1. The data set is subjected to processing by a rewrite means 23 which my be referred to as "rewrite engine". (cf. FIG. 2). On the one hand, the description of the data set, especially a so-called header (http—header) must be altered to filter out information relating specifically to the connection between the provider server 2 and the server means 3. Moreover, the header of the data set to be transmitted may contain additional references to the provider server 2 which are inserted there for technical reasons. Also, the header may contain control information to be passed on to the user in amended form only, such as a message about the move of a data set to a new communication address (http—redirect) A one-way parser in the server means 3 sequentially processes these items of header information and hands them to a separate function so that they may be recorded according to standard. The data which are not needed technically thus are eliminated.

The header of the data set is followed by a data portion of which the type is defined in the header. The data portion may comprise references corresponding to the respective standard and pointing to other directories and/or data sets in the provider server 2. In html data sets/documents these are, for example, so-called hyperlinks or hyperlink elements. If the user of the user computer 1 calls data sets which lie within a directory designated or installed by the provider as being with cost then the references comprised by these data sets, especially hyperlink elements must be rewritten by means of the rewrite engine 23 before being passed on from the server means 3 to the user computer 1. The hyperlink elements thus comprised, in turn, may point to other directories which are to be subject to compulsory payment. It is, therefore, the purpose of the rewriting to prevent that a hyperlink element in the data set retrieved by the user will give the user access to the other directories, circumventing the obligation to pay, i.e. that the user may retrieve the data sets stored in them without paying for them. For this reason the hyperlink elements must be neutralized in such a way that the user can-not recognize the actual communication address behind the hyperlink element. If the hyperlink element points to a directory with cost the hyperlink element must be replaced in the course of the automatic rewriting by the communication/data set address which was generated when the directory with cost/data set with cost was determined by the provider with the assistance of the server weans 3 (see above).

A module or reference file is filed in the provider server 2 as a further means of safety against abusive, charge-free retrieval of data sets with cost with every electronically recorded access to the data set with cost, it verifies automatically whether the access is taken through the server means 3. Access is prevented if that is not the case. This offers efficient protection against abuse in view of the fact that data sets with cost, when retrieved by means of the user computer 1, as described above, always are retrieved first from the provider server 2 by way of the server means 3 and then transmitted by the server means 3 to the user computer 1.

In case the hyperlink element is a reference to information/data sets which are retrievable without payment this hyperlink element remains unchanged and is not rewritten.

Three-step processing of the data portion of the data set by three parsing means included in the rewrite engine 23 is provided for effecting the necessary adaptation of the hyperlink elements, provided the data portion belongs to one of the known data types. In a first step, the structure of the data of the data portion must be opened up and divided into references (hyperlink elements) and other items of information. In a second step, the electronically recorded references are classified and sorted in a sorting means in the server means 3 in order to be able to distinguish between references to directories/data sets with cost subject to accounting according to the method described here and other references/ data sets, especially information free of charge. In a third step finally, the references to directories/data sets with cost are adapted or rewritten in such a way that the user will be able to load the contents of these references in the manner described above only with involvement of the server means 3. The rewriting of the hyperlink elements preferably may be carried out by means of the rewrite engine 23 or an additional rewrite means (not shown).

In this context a technical peculiarity must be taken into account if smooth and particularly transparent functioning is to be warranted. While the server means 3 still is loading the desired data set from the provider server 2, parts of this data set must be transmitted to the user computer 1, upon processing, especially rewriting of the hyperlink elements. Real time transmissions would not be possible with a method and apparatus operating according to the principle of "load data set—rewrite references/hyperlink elements and other information—send documents". The user always would have to wait until processing of the entire data set in the server means 3 would be completed. Only then could the transmission to the user computer 1 be accomplished.

For this reason the three parsing means for the operating steps defined above operate on the fly or in real time and, therefore, can load any desired small amount of the data set from the provider server for subsequent output to the user computer 1. Hereby the continuous data stream from the provider server 2 to the user computer 1 through the intermediate stage embodied by the server means 3 is guaranteed.

The features of the invention disclosed in the specification above, in the drawing and claims may be significant, either individually or in any desired combination, for implementing the invention in its various embodiments.

The invention claimed is:

1. A method of transmitting an electronic data set between a provider server (2) and a user computer (1), the electronic data set in the provider server (2) being included in an electronic directory and being stored in said directory under a designation, and a communication address in a network, which comprises the provider server (2) and a server means (3), being assigned to the electronic directory so that the electronic data set is electronically identifiable in the network by means of a data set address which comprises the communication address and the designation, said method comprising the following steps:
 (a) electronically recording a user request generated by a user by means of a browser in the user computer (1) for retrieval of the electronic data set from the electronic directory in the provider server (2) by way of the server means (3);
 (b) automatically requesting and recording user data for authentication of the user by way of the server means (3) and the user computer (1);
 (c) electronically processing the user data recorded and the information about the electronically recorded user request in the server means (3) for authorizing the user such that it is checked automatically by means of release information stored in the server means (3) whether any information about a current release for the electronic directory is electronically stored in the server means (3) for the user authenticated by the user data recorded;
 (d) transmitting the electronic data set of the electronic directory from the provider server (2) to the server means (3) and from the server means (3) to the user computer (1) if it is determined by the automatic checking according to method step (b) that the authenticated user is authorized;
 (e) syntactically analyzing the electronic data set by way of the server means (3) for electronically recording hyperlink elements which are included in the electronic data set and each comprise a different data set address pointing to an associated data set in the network, especially in the provider server (2);
 (f) electronically rewriting the data set address of one of said hyperlink elements prior to transmission of a part of the electronic data set which includes the hyperlink element from the server means (3) to the user computer (1) according to method step (d) if it is determined in the electronic checking of the one hyperlink element that the data set address of the one hyperlink element lies within the electronic directory, the electronic rewriting being carried out such that a rewritten data set address of the one hyperlink element is generated which address points to the server means (3); and
 (g) storing an electronic allocation between the data set address of the one hyperlink element and the rewritten data set address of the one hyperlink element by way of the server means (3) so that, upon a user request for retrieval of the data set belonging to the data set address of the one hyperlink element, transmission of the associated data set with involvement of the server means (3) is guaranteed.

2. The method as claimed in claim 1, characterized in that a temporary communication address for the directory is generated automatically in the server means (3) and assigned to the electronic data set prior to transmission of the electronic data set from the server means (3) to the user computer (1) so that the electronic data set is transmitted to the user computer (1) together with an electronically rewritten data set address which includes the temporary communication address.

3. The method as claimed in claim 2, characterized in that the temporary communication address includes a temporary parameter electronically assigned to the current release.

4. The method as claimed in claim 1, characterized in that the electronic memorization of the current release is limited to a predetermined period of time.

5. The method as claimed in claim 1, the method comprising the following further steps:
 automatically requesting a user input for electronically recording a readiness to pay by way of the server means (3) and the user computer (1) if it is determined in the electronic processing of the user data recorded and the information about the electronically recorded user request according to method step (d) that no information about the current release for the electronic directory is electronically stored in the server means (3) for the user authenticated by means of the user data recorded; and
 electronically recording and processing the requested user input such that an electronic account balance assigned to the user is adjusted automatically and the information about the current release for the electronic directory is stored in the server means (3).

6. The method as claimed in claim 1, characterized in that a temporary identification file is generated electronically by the server means (3) upon authentication of the user according to method step (b) and is stored in a memory means of the user computer (1) after having been transmitted to the user computer (1), and in that the temporary identification file is analyzed electronically for renewed user authentication which does not require requesting nor recording of the user data, after another user request for retrieval of the electronic data set or another electronic data set from the electronic directory in the provider server (2) was generated by the user by means of the browser in the user computer (1).

7. The method as claimed in claim 4, characterized in that, after renewed authentication and subsequent renewed authorization by the server means (3) carried out according to method set (d), a remaining period of time of the current release is determined automatically and information about the remaining period of time is generated electronically and transmitted to the user computer (1) for output.

8. The method as claimed in claim 6, characterized in that the temporary identification file is erased automatically from the memory means upon closing of the browser in the user computer (1).

9. The method as claimed in claim 1, characterized in that the syntactic analyzing is carried out on the fly while the electronic data set is transmitted at least in part from the provider server (2) to the server means (3).

10. A server means (3) which can be connected to a provider server (2) and a user computer (1) for transmitting an electronic data set in a network, the electronic data set in the provider server (2) being included in an electronic directory and being stored in said directory under a designation, and a communication address in the network being assigned to the electronic directory so that the electronic data set is electronically identifiable in the network by means of a data set address which comprises the communication address and the designation, the server means comprising:

a recording means for recording information transmitted from the provider server (2) to the server means (3) about a user request generated by means of the user computer (1) for retrieval of the electronic data set from the provider server (2);

an authentication means for automatically enabling authentication of a user of the user computer (1) in response to the recording of the user request;

a checking means for electronically checking a user authorization by means of stored release information which is stored electronically in a memory means;

a retrieving means for retrieval of the electronic data set from the provider server (2) in response to the checking of the user authorization;

a rewriting means for electronically generating a temporary communication address and for electronically rewriting the data set address belong to the electronic data set such that the data set address will include the temporary communication address; and a transmitting means for transmitting to the user computer (1) the electronic data set rewritten as regards the data set address and retrieved from the provider server (2).

11. The server means (3) as claimed in claim 10, characterized by a generating means for generating a temporary identification file.

12. The server means (3) as claimed in claim 10 characterized by a plurality of parsing means for syntactically analyzing the electronic data set to automatically record hyperlink elements.

13. The server means (3) as claimed in claim 12, characterized in that each of the plurality of parsing means operates according to the on the fly principle.

14. The server means (3) as claimed in 12, characterized by another rewriting means for electronically generating a further temporary communication address and for electronically rewriting the communication address which belongs to one of the hyperlink elements by means of the further temporary communication address.

15. The server means (3) as claimed in claim 12, characterized by a sorting means for sorting the automatically recorded hyperlink elements.

* * * * *

UNITED STATES PATENT AND TRADEMARK OFFICE
CERTIFICATE OF CORRECTION

| | | |
|---|---|---|
| PATENT NO. | : 7,197,641 B2 | |
| APPLICATION NO. | : 10/149155 | |
| DATED | : March 27, 2007 | |
| INVENTOR(S) | : Norbert Stangl | |

It is certified that error appears in the above-identified patent and that said Letters Patent is hereby corrected as shown below:

On the title page, item [56]:
Page 2, under "FOREIGN PATENT DOCUMENTS", replace

"WO 0801487 A2  10/1997" with -- EP 0801487 A2  10/1997 --.

Signed and Sealed this

Fifth Day of June, 2007

JON W. DUDAS
*Director of the United States Patent and Trademark Office*